United States Patent [19]

Hamlin et al.

[11] Patent Number: 4,940,997

[45] Date of Patent: Jul. 10, 1990

[54] OUT-OF-INK SENSING METHOD

[75] Inventors: Mindy A. Hamlin, Oceanside; George Kaplinsky, San Diego, both of Calif.

[73] Assignee: Hewlett-Packard Company, Palo Alto, Calif.

[21] Appl. No.: 390,807

[22] Filed: Aug. 8, 1989

[51] Int. Cl.[5] .................... G01D 15/18; G01F 23/00

[52] U.S. Cl. .................................. 346/140 R; 116/227

[58] Field of Search ....... 346/140 R, 140 W, 140 PD; 116/227

[56] References Cited

U.S. PATENT DOCUMENTS 3,699,914 10/1972 Smith .................................. 116/227

4,814,786 3/1989 Hoisington et al. ................ 346/1.1

OTHER PUBLICATIONS

Loiselle, J. T., Bilevel Optical Ink Level Detector, Sep. 1975, IBM Technical Disclosure Bulletin, vol. 18, No. 4, pp. 1095-1096.

*Primary Examiner*—George H. Miller, Jr.

[57] ABSTRACT

In an ink-jet printer, a ball check-valve (32) is used over the ink outlet (28) of an ink bag (16) to interrupt the flow of ink and/or air to the ink bladder when the ink supply in the bag falls below a predetermined level (40). The specific gravity of the ball is less than the specific gravity of ink in the bag but greater than the specific gravity of air.

14 Claims, 1 Drawing Sheet

OUT-OF-INK SENSING METHOD

TECHNICAL FIELD

This invention relates to ink-jet printers and to ink cartridges used therein. More particularly, this invention relates to method and means for cutting off the supply of ink from the ink bag to the ink bladder just before the ink bag runs dry. In this way, air, which is present in the ink bag, is prevented from entering the ink bladder, thereby permitting detection of an out-of-ink situation.

BACKGROUND ART

Various means for storing a significant quantity of ink in an ink bag or other container in an ink-jet printer and supplying it in smaller quantities to an ink bladder are known in the prior art. For instance, an ink delivery system has been developed which is provided with a reservoir for supplying a refillable bladder. The bladder is then used to feed the printhead, and when the bladder is depleted, it is refilled from the reservoir, or ink bag. The system utilizes a three-way valve which permits selective fluid communication between the ink bag and the bladder (refill mode) and between the bladder and the ink-jet printhead (print mode). A third position (shipping mode) prevents fluid communication between any of the compartments. U.S. Pat. No. 4,714,937 describes and claims this system.

In the embodiment illustrated in the afore-mentioned patent, the ink bag and the ink bladder are shown mounted side by side on a support platform; the three-way valve and fluid communicating channels are located under the top surface of the platform. The ink flows out of the bottom of the ink bag and into a short vertical channel; then it flows horizontally to the three-way valve; next, with the valve in the refill mode, it flows through the valve into a vertical channel and up into the ink bladder. When the valve is turned to the print mode, the ink flows out of the bottom of the bladder through the vertical channel to the three-way valve, then through the valve into another channel to the printhead.

In another arrangement, not illustrated in the patent but illustrated herein, the ink bag is mounted on the platform and the ink bladder is suspended from the platform and is at a level below the ink bag. With the valve in the refill mode, ink flows out of the bottom of the ink bag into a vertical channel, then into the three-way valve where it is diverted into a horizontal channel to the ink bladder. When the three-way valve is turned to the print mode, ink returns through the horizontal channel to the three-way valve where it is now diverted to another channel to the printhead.

A problem associated with both of these systems occurs when the ink supply is depleted. This allows the air in the ink bag to enter the bladder, from which the air needs to be removed. This task increases the complexity and cost of the product.

In a copending application Ser. No. 378,354, filed on July 11, 1989 and assigned to the same assignee as this application, a sensor system is described and claimed. In a system like the one set out in FIG. 1 of the copending application, a dimpler sets a predetermined back pressure in the system. It also acts as a plunger on the bladder to purge any air trapped in the bladder back into an ink bag. An electrical or mechanical sensor mounted on the dimpler will sense the presence of the bladder in the undimpled mode. If it does not find the bladder, the machine knows that the bladder is out of ink. Then, the three-way valve is rotated to the refill mode and the bladder is refilled. As the bag empties, it collapses. When the bag is emptied, the dimpled bladder can not refill because of a hydraulic lock.

However, it is common for air to be present in the ink bag and to accumulate in the bladder, which is an elastomer. When this happens, the bladder will refill with air rather than ink. The out-of-ink sensor on the dimpler will indicate a bladder full of ink, even though air may be present. This results in a printing failure.

DISCLOSURE OF THE INVENTION

We have found a simple and effective system to prevent air from escaping from the ink bag into the ink bladder. A ball check-valve is placed in the ink bag to cut off the flow of ink when ink in the bag is near depletion. A ball that will float in the ink but sinks in air is placed in a perforated container over the ink outlet from the ink bag. Once the ink reaches a minimum level, the ball will nest in the outlet and effectively cut off the flow of ink from the ink bag. The perforated container is designed and located to keep the ball in position above the outlet; it is also designed so that it does not impede the flow of ink.

BRIEF DESCRIPTION OF THE DRAWINGS

FIG. a side elevational, cross-sectional view of a print engine, showing a ball check-valve and its restraining cage in relation to the ink outlet.

Figure 1:
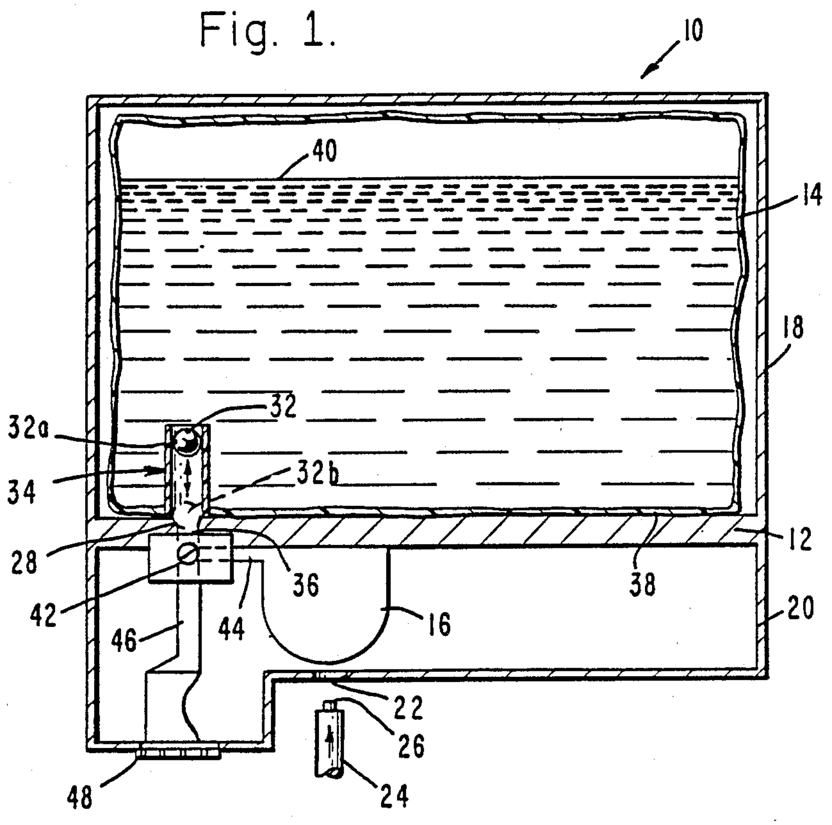

FIG. a side elevational, cross-sectional view of a ball check-valve and restraining cage, showing the location of the ball in the cage and in the ink outlet when the ink is essentially depleted.

BEST MODE FOR CARRYING OUT THE INVENTION

Referring now to the drawings wherein like numerals of reference designate like elements throughout, an ink delivery system is depicted generally at 10. The ink delivery system or apparatus 10 comprises a support platform 12, which supports an ink bag 14, and from which a bladder 16 is suspended. A cover 18 may be used to protect ink bag 16, and a second cover 20 may be used to protect bladder 16 and other components of delivery system 10. Covers 18 and 20 may be secured together or around the components to be protected by a snap fit arrangement (not shown) or other well-known means. Cover 20 has opening 22 positioned under bladder 16 so that dimpler 24 and sensor 26 can be brought into contact with bladder 16.

Figure 3:
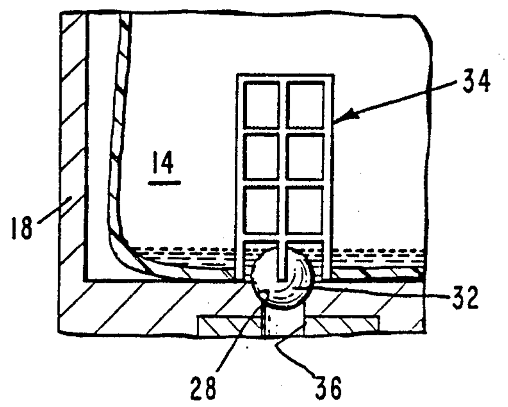
Figure 2:
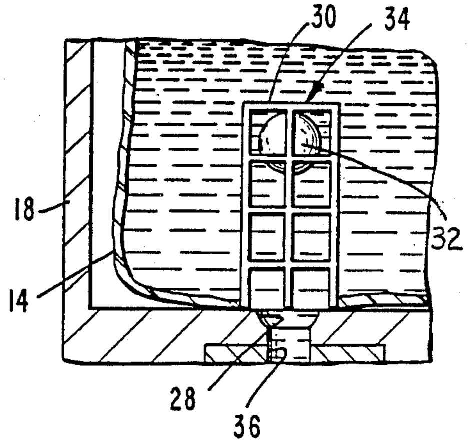
FIG. 2 is a side elevational, cross-sectional view of a ball check-valve and restraining cage, showing the location of the ball in the cage, remote from the ink outlet, when ink bag is full.

Ink outlet 28 is located in support platform 12. The upper end of outlet 28 is preferably chamfered so that ball 32 will nest therein when ink bag 14 is essentially out of ink, as shown in FIG. 3. Ball 32 is made of material so that the ball will float in ink but will not float in air. There are many ways of doing this. For instance, the ball may be made of polypropylene, which has a specific gravity of about 0.92, or low density polyethylene, which has a specific gravity of about 0.96. Also, a hollow metal ball may be employed.

Cage 34 is used to keep ball 32 in line with outlet 28. Any material that will not adversely influence the ink and will not be adversely influenced by the ink may be used to construct cage 34. A preferred material is polyethylene. Cage 34 is cylindrical in shape and is designed to permit free flow of ink out of bag 14 and into outlet 28; for example, a mesh construction. It has an open end that surrounds opening 28. The diameter of cage 34 is slightly larger than the diameter of ball 32, which, in turn, is slightly larger than top diameter of outlet 28. In one embodiment, the diameter of cage 34 was 6 mm, the diameter of ball 32 was 4.73 mm, the diameter at the top of outlet 28 was 4 mm, and the diameter at the bottom of a 45° chamfer from the top of outlet 28 was 3 mm. This 3 mm opening is the beginning of ink channel 36 that runs to three-way valve 42.

The height of cage 34 should be enough so that, when there is ink in bag 14, ball 32 will float clear of outlet 28 and will not interfere with the flow of ink into outlet 28. Top 30 of cage 34 must be such that ball 32 will be retained in cage 34, even when ink bag 14 is full of ink. Like the rest of cage 34, top 30 can be of open mesh construction, but it may also be closed. Cage 34 may be integrated into bottom support 38 of ink bag 14, but it may also be a separate piece, in which case it must be secured over outlet 28 in some manner, such as being glued in place.

When ink level 40 is almost as high as cage 34, ball 32 will be in position **32*a* in the top of cage 34. As ink level 40 is lowered, for example, through use in the printing process, ball 32 will remain in position 32*a* until level 40 is lower than the top of cage 34. Ball 32 will then gradually fall with the drop in level 40, until it nests in position 32*b* (shown in broken line) in outlet 28. At this point ink level 40 will have fallen, as shown in FIG. 3. A small amount of ink, e.g., 3%, and all the air will be trapped in ink bag 14**.

Ink flows from ink bag 14 through outlet 28 and into ink channel 36. If three-way valve 42 is in the refill mode, ink will flow through the valve into bladder 16 by way of second ink channel 44. When bladder 16 is filled, its status will be detected by sensor 26, such as disclosed in copending application Ser. No. 378,354. Dimpler 24 can then be used to force a small amount of ink and any air that has accumulated in the bladder back into ink bag 14. This creates a certain amount of back pressure in the bladder. When three-way valve 42 is turned to the print mode, the system is ready to print. Ink flows out of bladder 16 through ink channel 44, through three-way valve 42, then through ink channel 46 to printhead 48.

A primary advantage of this invention is that it prevents the user of the delivery system from initiating a print/plot when the pen is out of ink. It prevents the bladder from refilling with air when there is no ink in the bag. As a result, there is no media or ink wasted when a pen runs out of ink; the plot time which would otherwise be used for a failed plot is eliminated; the user's perceived reliability of the technology is increased; and it is very helpful in overnight unattended plotting when many blank plots could be generated with an empty pen.

INDUSTRIAL APPLICATION

The present invention is useful in ink printers, such as thermal ink-jet printers.

Thus, there has been disclosed an improved means for sensing an out-of-ink condition in an ink-jet printer. It will be appreciated by those skilled in the art that various changes and modifications of an obvious nature may be made without departing from the spirit of the invention, and all such changes and modifications are considered to fall within the scope of the invention, as defined by the appended claims.

We claim:

1. In an ink-jet printer having an ink bag, a bladder, a printhead, and a three-way valve which can selectively provide ink from the bag to the bladder, or from the bladder to the printhead, or cut off flow of ink in any direction, the improvement consisting of using a ball check-valve to terminate ink flow from the ink bag to the bladder when ink in the ink bag falls below a predetermined level.

2. The improvement of claim 1 wherein the ball check-valve is contained in a perforated cage placed above an ink outlet in the bottom of the ink bag.

3. The improvement of claim 2 wherein the perforated cage is made of polyethylene.

4. The improvement of claim 1 wherein the ball of the check-valve has a specific gravity that is less than the specific gravity of ink but greater than the specific gravity of air.

5. The improvement of claim 1 wherein ink flow is terminated when the ink in the ink bag is near depletion.

6. The improvement of claim 1 wherein the ball of the check-valve is made of polypropylene.

7. The improvement of claim 1 wherein the ball of the check-valve is made of polyethylene.

8. In an ink-jet printer having an ink bag, a bladder, a dimpler to initiate negative pressure in the bladder, a sensor to determine ink quantity in the bladder, a printhead, and a three-way valve which can selectively provide ink from the bag to the bladder, or from the bladder to the printhead, or cut off flow of ink in any direction, the improvement consisting of using a ball check-valve to terminate ink flow from the ink bag to the bladder when ink in the ink bag falls below a predetermined level.

9. The improvement of claim 8 wherein the ball check-valve is contained in a perforated cage placed above an ink outlet in the bottom of the ink bag.

10. The improvement of claim 8 wherein ink flow is terminated when the ink in the ink bag is near depletion.

11. The improvement of claim 8 wherein the ball of the check-valve has a specific gravity that is less than the specific gravity of ink but greater than the specific gravity of air.

12. The improvement of claim 8 wherein the ball of the check-valve is made of polypropylene.

13. The improvement of claim 8 wherein the ball of the check-valve is made of polyethylene.

14. The improvement of claim 8 wherein the perforated cage is made of polyethylene.

* * * * *